United States Patent [19]

Tanca

[11] Patent Number: 4,602,573
[45] Date of Patent: Jul. 29, 1986

[54] INTEGRATED PROCESS FOR GASIFYING AND COMBUSTING A CARBONACEOUS FUEL

[75] Inventor: Michael C. Tanca, Tariffville, Conn.

[73] Assignee: Combustion Engineering, Inc., Windsor, Conn.

[21] Appl. No.: 704,438

[22] Filed: Feb. 22, 1985

[51] Int. Cl.[4] .............................. C10J 3/46; C10J 3/86; F23B 7/00

[52] U.S. Cl. ..................................... 110/342; 48/203; 110/229; 110/345; 110/346; 110/347

[58] Field of Search ............... 110/229, 342, 345, 346, 110/347; 48/203

[56] References Cited

U.S. PATENT DOCUMENTS

| | | | |
|---|---|---|---|
| 4,232,615 | 11/1980 | Brown | 110/347 |
| 4,262,610 | 4/1981 | Heim et al. | 110/342 |
| 4,285,283 | 8/1981 | Lyon et al. | 110/347 |
| 4,407,206 | 10/1983 | Bartok et al. | 110/347 |
| 4,411,204 | 10/1983 | Hamilton | 110/397 |
| 4,423,702 | 1/1981 | Ashworth et al. | 110/229 |
| 4,426,939 | 1/1984 | Winship | 110/347 |

Primary Examiner—Peter Kratz
Attorney, Agent, or Firm—William W. Habelt

[57] ABSTRACT

A first portion (50) of a sulfur and nitrogen-bearing carbonaceous fuel is gasified in a gasification reactor (20) in the presence of a reducing atmosphere of air to produce a hot, char-containing, carbon-monoxide-rich fuel gas (42) having a low Btu content. After cooling, the char-containing carbon-monoxide-rich fuel gas (42) is introduced into a steam generating furnace (10) and combusted therein with a second portion (40) of the carbonaceous fuel in the presence of at least sufficient additional air to substantially complete combustion whereby a hot flue gas is produced. A sulfur-capturing material (60) is introduced into both the gasification reactor (20) and the combustion zone of the steam generating furnace (10) to absorb a substantial portion of the sulfur-containing gases produced during the gasification and combustion processes. By combusting the second portion of the carbonaceous fuel together with the cooled, carbon-monoxide rich, low Btu content fuel gas, nitrogen oxide produced during combustion in the steam-generating furnace (10) is also reduced.

11 Claims, 1 Drawing Figure

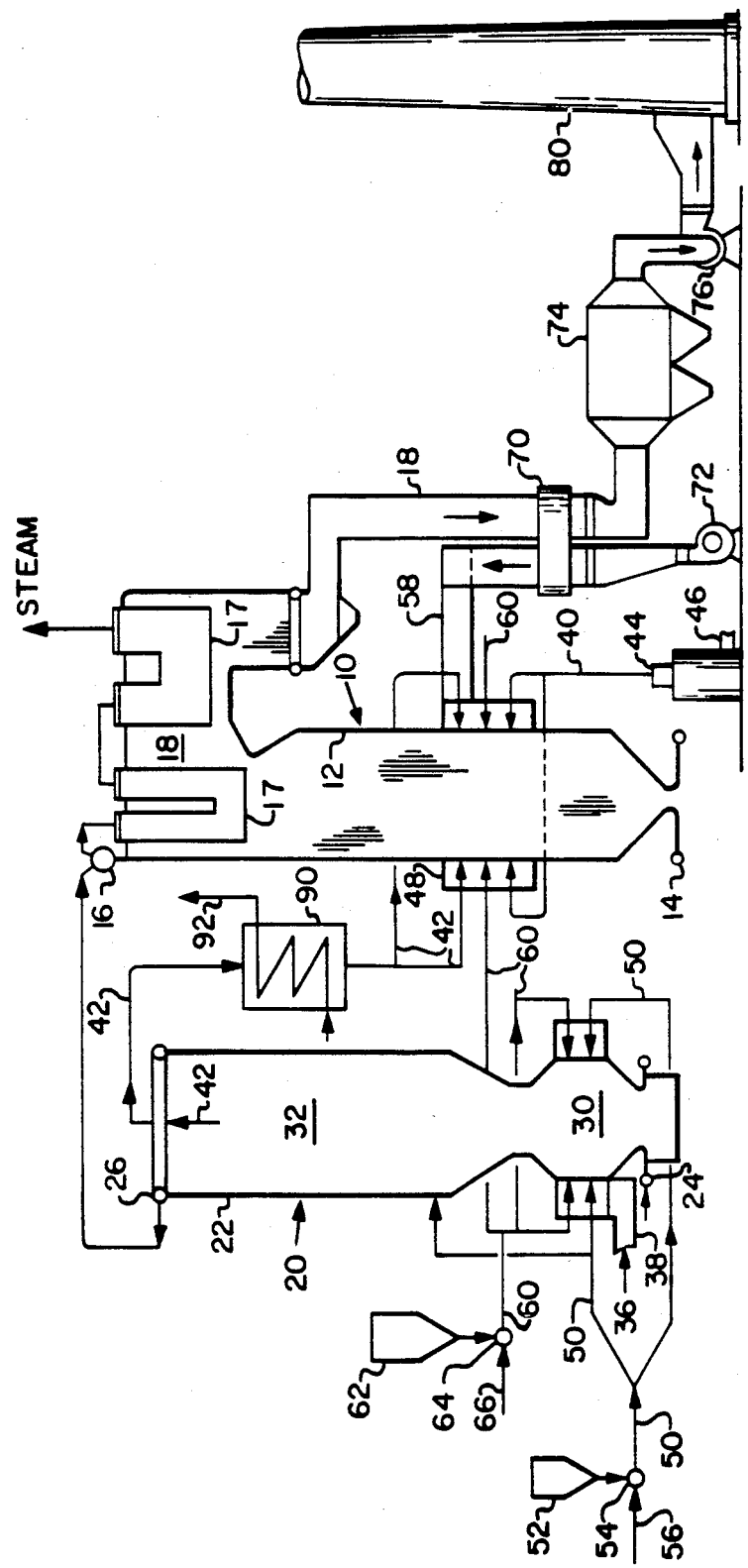

INTEGRATED PROCESS FOR GASIFYING AND COMBUSTING A CARBONACEOUS FUEL

BACKGROUND OF THE INVENTION

The present invention relates to a method of gasifying and combusting a carbonaceous fuel and, more particularly, to an integrated process wherein a sulfur and nitrogen-bearing carbonaceous fuel is gasified to produce a carbon monoxide-rich low Btu fuel gas with is subsequently combusted with additional carbonaceous fuel in a steam generating furnace.

Carbonaceous fuels, such as coal, peat, lignite and carbon-containing refuse, are abundant fossil fuel sources available for use in steam generating furnaces. However, due to the presence of nitrogen and sulfur compounds inherently in such carbonaceous fuel, the combustion of these fuels and steam generating furnaces create obnoxious gases such as nitrogen oxides and sulfur oxides which must be removed from the flue gas generated in the furnace prior to venting the flue gas to the atmosphere. One proposed method of utilizing carbonaceous fuel for steam generated generation in a more environmentally acceptable manner has been to gasify the carbonaceous fuel to produce a fuel gas which is treated for the removal of sulfur compounds therein and then fired in a steam generating furnace to produce steam and a hot flue gas having a lower sulfur oxide content.

One such method is presented in U.S. Pat. No. 3,818,869 wherein a steam generator is integrated with an on-sight coal gasification plant which produces a low Btu gaseous fuel for the steam generator from a high sulfur content coal. As disclosed therein, the high sulfur content coal is gasified in a reducing atmosphere to produce a low Btu fuel gas. This low Btu fuel gas contains unburned carbon and also hydrogen sulfide which is formed from sulfur contained in the coal. Therefore, this low Btu fuel gas is passed through a gas cleanup system wherein the char particles contained therein are removed and recycled to the gasifier and the hydrogen sulfide therein is chemically removed from the fuel gas to produce a clean fuel gas essentially free of particulate matter and sulfur compounds. This clean low Btu gas is then combusted in air in a steam generating furnace to produce a hot flue gas which has a low sulfur oxide content. This hot flue gas is used as in a conventional steam generator to produce steam for electrical generation or industrial purposes.

In order to produce a flue gas having a low sulfur oxide content in accordance with the above described process, it is necessary to provide a complex desulfurization system in order to remove the hydrogen sulfide from the low Btu fuel gas. The hydrogen sulfide is formed upon combustion of this sulfur-containing carbonaceous fuel in the reducing atmosphere of the gasifier. It is an object of the present invention to provide a method for the integrated gasification and combustion of a sulfur-bearing carbonaceous fuel wherein the step of processing the fuel gas produced in the gasifier to remove gaseous sulfur compound therefrom can be eliminated. Further, it is an object of the present invention to provide a method for the integrated gasification and combustion of carbonaceous material wherein a portion of the carbonaceous material is gasified to produce a low Btu content fuel gas which may be combusted in a steam generated furnace in conjunction with additional carbonaceous material to produce a fuel gas having not only a low sulfur oxide content but also a low nitrogen oxide content.

SUMMARY OF THE INVENTION

In accordance with the present invention, a first portion of sulfur and nitrogen-bearing carbonaceous fuel is gasified in a gasification reactor in a reducing atmosphere of air to produce a hot, char-containing, carbon monoxide-rich fuel gas having a low Btu content. A sulfur capturing material is introduced into the gasification reactor so that the gasifying of the carbonaceous fuel is carried out in the presence of the sulfur capturing material whereby a substantial portion of the sulfur in the carbonaceous fuel being gasified is captured by the sulfur capturing material. The hot, char-containing, carbon monoxide-rich fuel gas produced in the gasification reactor is passed through a heat exchanger in indirect heat exchange relationship with the heat exchange fluid to cool the fuel gas to a temperature less than about 1000° F. The cooled, char-containing, carbon monoxide-rich fuel gas is then passed from the heat exchanger into a combustion chamber within a vapor generating furnace into which a second portion of the carbonaceous fuel is also introduced. The second portion of the carbonaceous fuel is combusted together with the cooled, char-containing, carbon monoxide-rich fuel gas within the combustion zone of the vapor generating furnace in the presence of at least sufficient additional air to substantially complete combustion whereby a hot flue gas is produced having a reduced emission of nitrogen oxide pollutants. The fuel gas and the second portion of carbonaceous fuel may be directly mixed for combustion in the furnace or introduced separately into the furnace and combusted via a staged combustion process. A sulfur capturing material is also introduced into the combustion zone of the vapor generating furnace so that the combustion of the second portion of the carbonaceous fuel is carried out in the presence of the sulfur capturing material whereby a substantial portion of the sulfur in the second portion of the carbonaceous fuel is captured by said sulfur capturing material. The fuel gas generated in the combustion zone of the vapor generating furnace by combusting the second portion of the carbonaceous fuel together with the cooled, carbon monoxide-rich fuel gas is passed through a particulate collecting apparatus so as to remove therefrom a substantial portion of the sulfur capturing material with the sulfur captured therein. The integrated gasification and combustion process of the present invention provides an environmentally acceptable method of utilizing nitrogen and sulfur-bearing carbonaceous fuel wherein the flue gas produced has a low content of sulfur-based and nitrogen-based pollutants.

BRIEF DESCRIPTION OF THE DRAWING

The sole FIGURE of the drawing is a schematic illustration of a gasifier and vapor generating furnace integrated for operation in accordance with the present invention.

DESCRIPTION OF THE PREFERRED EMBODIMENT

Referring now to the drawing, there is depicted therein a furnace generally indicated as 10 formed of bounding walls 12 of steam generating tubes and a gasifier generally indicated as 20 formed of bounding walls 22 of steam generating tubes. To generate steam in the furnace 10, water is supplied to the lower inlet headers 14 and passed upwardly through the steam generating tubes of the bounding walls 12 wherein steam is generated. The steam and water mixture leaving the bounding walls 12 is collected in the upper drum 16 wherein the steam and water are separated. This steam is then passed through superheater tube banks 17 disposed in the gas exit duct 18 which interconnects the furnace 10 of the steam generator with the stack 80 for providing a flow passage for conveying the hot flue gases formed in the furnace 10 to the stack preventing to the atmosphere. Similarly, to generate steam in the gasifier 20, water is supplied to the lower inlet headers 24 and passed upwardly through the steam generating tubes of the bounding walls 22 wherein steam is generated. The steam and water mixture leaving the bounding walls 22 is collected in the upper header 26. The steam and water mixture collected in the upper header 16 may then be passed to any of a number of devices to perform useful work or passed to the drums 14 of the steam generating furnace 10 to mix with the steam water mixture leaving the steam generating tubes of the bounding walls 12 of the furnace 10. The steam separated in the drum 16 is passed through the superheat surface 17 in heat exchange relationship with the hot flue gases generated in the furnace 10 and leaving the furnace 10 through the exit duct 18 thereby superheating this steam.

As the hot flue gas leaving the furnace 10 through the gas exit duct 18 traverses the steam heating surface 17 disposed therein, the hot flue gases cooled by transferring heat to the steam flowing through the steam heating surface 17 to a temperature typically in the range of 320°–420° C. The flue gas is then typically further cooled to a temperature in the range of 120°–150° C. by passing the flue gas in heat exchange relationship with combustion air being supplied to the furnace 10 by a forced draft fan 72 through an air preheater 70 disposed downstream of the furnace 10 in the gas exit duct 18. Further disposed downstream of the furnace 10 in a gas duct 18 is a particulate collector 74 wherein ash particles and other particulate matter entrained in the flue gas during the gasification and combustion process is removed therefrom. The cooled cleaning flue gas leaving the particulate collector 74 is passed through induced draft fan 76 and vented to the atmosphere via the gas stack 80. The fan 76 boosts the pressure of the cooled clean flue gas before it is vented to the atmosphere and induces the flow of the hot flue gases from the furnace 10 through the gas exit duct 18 to the stack 80.

In accordance with the present invention, the gasification and combustion process are integrated in such a manner so as to produce a resultant flue gas having a reduced content of sulfur-based and nitrogen-based pollutants contained therein. A first portion of the sulfur and nitrogen-bearing carbonaceous fuel is gasified in the gasification reactor 20 in the presence of a reducing atmosphere of air to produce a hot, char-containing, carbon monoxide-rich fuel gas having a low Btu content. After cooling the hot, char-containing carbon monoxide-rich fuel gas produced in the gasification reactor to a temperature less than about 1000° F., the cooled, char-containing, carbon monoxide-rich fuel gas is introduced into the steam generating furnace 10 and combusted therein with a second portion of the sulfur and nitrogen-bearing carbonaceous fuel in the presence of at least sufficient additional air to substantially complete combustion whereby a hot flue gas is produced.

The fuel gas and the second portion of carbonaceous fuel may be directly mixed for combustion in the furnace 10 or introduced separately into the furnace and combusted via a staged combustion process. Depending upon the particular installation and the fuel itself, the first portion of the fuel may constitute from about 10% to about 80% of the total supply of carbonaceous fuel, with the second portion accounting for the remainder thereof.

The hot flue gas produced by combusting the second portion of the nitrogen-bearing carbonaceous fuel in the furnace 10 in the presence of the low-Btu content fuel gas produced in the coal gasifier produces a flue gas having a reduced emission of nitrogen oxide pollutants. Nitrogen oxide production from the oxidation of nitrogen in the air during the combustion process by well known thermally dependent mechanisms will be substantially reduced due to the lower combustion temperature present in the steam generating furnace resulting from the dillution effect of the low Btu fuel gas. Additionally, nitrogen oxide production by the conversion of nitrogen contained in the carbonaceous fuel itself will be reduced due to the combustion of the carbonaceous fuel in the presence of the carbon monoxide-rich fuel gas. It is believed that the carbon monoxide present in the fuel gas will compete with the nitrogen in the fuel for the available oxygen and will also act as a reducing agent on nitrogen oxides formed early in the combustion process from the oxidation of nitrogen in the carbonaceous fuel resulting in a conversion of this nitrogen oxide to molecular nitrogen and the carbon monoxide to carbon dioxide. Further in accordance with the present invention, a sulfur capturing material is introduced both into the gasification reactor 20 and the combustion zone of the vapor generating furnace 10 so that the gasification of the first portion of the sulfur-bearing carbonaceous fuel and the combustion of the second portion of the sulfur-bearing carbonaceous fuel is carried out in the presence of the sulfur capturing material whereby a substantial portion of the sulfur containing gases produced during the gasification and combustion processes are captured by the sulfur capturing material rather than remaining in the flue gas being vented to the atmosphere. The sulfur capturing material together with the sulfur captured therein is removed from the flue gas as it passes through the particulate collector 74. Thus, the flue gas being vented to the atmosphere through the stack 80 will have a lower content of sulfur-based and nitrogen-based pollutants than would a typical flue gas produced in a steam generating furnace firing sulfur and nitrogen-bearing carbonaceous fuels in a conventional manner.

To fire the gasification reactor 20, a first portion of the carbonaceous fuel, preferably in a pulverized form, is passed from storage bin 52 through feeder 54 into a stream of conveying gas 56 to form a mixture of carbonaceous fuel and conveying gas 50 which is passed into the lower reaction zone 30 of the gasification reactor 20. Although air is most frequently used as the conveying gas, it is to be understood that other gases such as flue gas, carbon dioxide, or oxygen-rich air or mixtures thereof with air may be used as the conveying gas. A supply of preheated air 36 is also passed to the lower reaction zone 30 of gasification reactor 20 through supply duct 38 and windbox 28. The amount of air supplied to the lower reaction zone 30 of the gasification reactor 20 comprises an amount less than the theoretical amount of air necessary to stoichiometrically combust the first portion of the carbonaceous fuel introduced into the gasification reactor 20 and, preferably less than about 70% of the theoretical amount of air necessary to stoichiometrically combust the first portion of the carbonaceous fuel introduced into the gasification chamber 20. The carbonaceous fuel introduced into the lower reaction zone 30 of the gasifier 20 is partically combusted in the preheated air 36 also supplied thereto to produce a hot gas containing substantial amounts of unburnt char which passes upwardly into and through the upper reaction zone 32 of the gasifier 20 wherein well known gasification reactions occur to produce a hot, char-containing, carbon monoxide-rich fuel gas 42 having a low Btu content. If desired, such as with fuels of low reactivity, a part of the first portion of carbonaceous fuel being supplied to the gasifier 20 may be introduced into the upper reaction zone 32 of the gasifier 20 rather than the lower reaction zone 30 of the gasifier 20 to further assist the gasification reactions occurring within the upper reaction zone 32. For fuels of high reactivity, all the fuel may be introduced into the lower reaction zone 30 thereby allowing for one-stage operation.

As the gasification reactions occurring within the gasification reactor 20 take place in a reducing atmosphere, the sulfur compound contained in the sulfur-bearing carbonaceous fuel supplied to the gasifier 20 will be converted to hydrogen sulfide. As mentioned hereinbefore, it has been necessary in prior art systems to provide a complex desulfurization reactor downstream of the gasification reactor to remove hydrogen sulfide formed during the gasification process from the fuel gas. In accordance with the present invention, this desulfurization step is avoided, or at least minimizes, by introducing into the gasification reactor a sulfur capturing material so that the gasification of the carbonaceous fuel is carried out in the presence of the sulfur capturing material. A sulfur capturing material, such as pulverized limestone, dolomite, or other particulate absorbent material, is passed from a storage bin 62 through feeder 64 into a conveying gas 66 to form a pulverized limestone and conveying gas mixture 60 which is introduced into the lower reaction zone 30 of the gasifier 20 and, if desired, also into the upper reaction zone 32 of the gasifier 20 so that the gasification reactions take place in the presence of the sulfur capturing material. In this manner, the hydrogen sulfide formed during the gasification of this first portion of the sulfur-bearing carbonaceous fuel will react with the sulfur capturing material, such as pulverized limestone, to form a sulfur-bearing particulate salt which may thereafter be readily removed from the gas stream by means of a conventional particulate collector such as an electrostatic precipitator, a baghouse filter, or even one or more highly efficient cyclone type collectors. By introducing a particulate sulfur collecting material into the gasification reactor 20, it is ensured that a substantial portion of the sulfur contained in the carbonaceous fuel will be absorbed by the particulate material rather than remain present in the fuel gas 42 as a gaseous sulfur compound.

The hot, char-containing, carbon monoxide-rich fuel gas 42 produced in the gasification reactor 20 is passed from the gasification reactor 20 to the vapor generating furnace 10 for subsequent combustion therein. Prior to introduction into the vapor generating furnace 10, the hot, char-containing, carbon monoxide-rich fuel gas passing from the gasification reactor 20 is passed through the heat exchanger 90 in indirect heat exchange relationship with the heat exchange fluid 92 to cool the fuel gas to a temperature less than about 1000° F. prior to introduction into the steam generating furnace 10 thereby permitting the windbox to be constructed out of conventional materials. By cooling the low-Btu gas prior to introduction into the furnace 10 for combustion therein, the peak flame temperature which will occur in the vapor generating furnace 10 is lowered thereby resulting in a reduction in subsequent nitrogen oxide formation within the vapor generating furnace 10 during the combustion of the fuel gas.

A second portion 40 of the sulfur and nitrogen-bearing carbonaceous fuel is pulverized in a pulverizer 44 and entrained in a stream of preheated air 46 supplied to the pulverizer as the preheated air sweeps through the pulverizer. This second portion 40 of the carbonaceous fuel is supplied to a plurality of burners 28 disposed in the windbox 48 of the steam generating furnace 10. Combustion air, which has been pretreated by passing in heat exchange relationship in the air preheater 70 with the flue gases leaving the furnace 10 through the exit duct 18, is supplied through duct 58 to the windbox 48 for introduction into the furnace 10. The amount of total air supplied to the furnace 10 is controlled such that the second portion 40 of the carbonaceous fuel together with the cooled, char-containing carbon monoxide-rich fuel gas 42 is substantially completely combusted within the vapor generating furnace 10 to produce a hot flue gas. As mentioned previously, due to the low Btu content of the fuel gas 42 and also due to its low temperature, the peak combustion temperature present within the furnace 10 during the combustion process is lower than that temperature would be under a conventional combustion process for burning carbonaceous fuel in a steam generating furnace which thereby results in a reduced formation of nitrogen oxide pollutant during the combustion process. Additionally, the carbon monoxide contained in the fuel gas competes with nitrogen in the carbonaceous fuel itself for oxygen and also serves as a reducing agent to convert nitrogen oxide formed in the initial combustion of the fuel from oxidation of nitrogen in the fuel itself to molecular nitrogen.

Further in accordance with the present invention, additional sulfur capturing material 60 is introduced into the combustion zone of the vapor generating furnace 10 so that the combustion of the second portion of the sulfur-containing carbonaceous fuel is carried out in the presence of the sulfur capturing material. As the sulfur in the second portion of the carbonaceous fuel is converted to sulfur dioxide in the oxidizing atmosphere present in the combustion zone of the vapor generating furnace 10, the sulfur dioxide is absorbed by the limestone, dolomite or other particulate sulfur capturing material, to form a particulate sulfite or sulfate salt which may be readily removed from the flue gas in the downstream particulate collector 74. In this manner, a substantial portion of the gaseous sulfur dioxide formed during the combustion process in the vapor generating furnace 10 is absorbed from the flue gas and retained in a particulate salt form more readily removable from the flue gas than the gaseous sulfur dioxide.

The hot flue gas formed in the combustion zone of the vapor generating furnace 10 exits therefrom through the gas exit duct 18 passing over the steam heating surface 17 to superheat the steam formed in the bounding walls 12 of the vapor generating furnace 10 and also the steam formed in the bounding walls 22 of the gasification reactor 20. After passing over the steam heating surface 17, the flue gas passing through the exit duct 18 is further cooled by passing in heat exchange relationship with combustion air being supplied to the furnace 10 through the air preheater 70 disposed downstream of the furnace 10 in the gas exit duct 18. The cooled flue gas leaving the air preheater 70 is then passed through a particulate collector 74 such as an electrostatic precipitator or a baghouse filter for one or more highly efficient cyclone collectors, to remove the particulate ash and particulate sulfur capturing material therefrom prior to passing the clean flue gas through the induced draft fan 76 and venting the clean flue gas to the atmosphere via stack 80.

The sulfur capturing material, such as pulverized limestone, introduced into the gasification reactor 20 and the vapor generating furnace 10 may be introduced into the first and second portions 50 and 40 of the carbonaceous fuel prior to their introduction, respectively, into the gasification reactor 20 and the vapor generating furnace 10. In this manner, a more intimate contact between the carbonaceous fuel and the sulfur capturing material may be ensured both during the gasification process within the gasification reactor 20 and during the combustion process within the vapor generating furnace 10. This more intimate contact between the sulfur capturing material 60 and the carbonaceous fuel would serve to enhance the capture of gaseous hydrogen sulfide formed during the gasification process and gaseous sulfur dioxide formed during the combustion process.

Accordingly, it should be appreciated that the present invention provides an integrated gasification and combustion process for treating sulfur and nitrogen-bearing carbonaceous fuels wherein the flue gas produced has a reduced content of sulfur-based and nitrogen-based compounds without providing any equipment for the complex liquid gas reactions typically utilized to remove sulfur dioxide from flue gases and also without any of the catalytic beds proposed for removing nitrogen oxides from flue gases of vapor generating plants burning sulfur and nitrogen-bearing carbonaceous fuels by conventional prior art means.

It should be understood that the embodiment shown in the drawing for carrying out the method of the present invention is merely illustrative and not restrictive in that variations of modifications by those skilled in the art may be made thereto without departing from the spirit and scope of the method of the present invention as recited in the claims appended hereto.

I claim:

1. An integrated gasification/combustion process for sulfur and nitrogen-bearing carbonaceous fuels wherein a flue gas is produced having a reduced content of sulfur-based and nitrogen-based compounds, comprising:
    a. gasifying a first portion of said carbonaceous fuel in a gasification reactor in the presence of air to produce a hot char-containing carbon monoxide-rich fuel gas having a low Btu content;
    b. introducing a sulfur capturing material into the gasification reactor so that the gasifying of said carbonaceous fuel is carried out in the presence of said sulfur capturing material whereby a substantial portion of the sulfur in the first portion of said carbonaceous fuel is captured by said sulfur capturing material;
    c. passing the hot char-containing carbon monoxide-rich fuel gas produced in the gasification reactor through a heat exchanger in indirect heat exchange relationship with a heat exchange fluid to cool the fuel gas to a temperature less than about 1000° F.;
    d. introducing the cooled char-containing carbon monoxide rich fuel gas passing from the heat exchanger into a combustion zone within a vapor generating furnace;
    e. introducing a second portion of said carbonaceous fuel into the combustion zone of the vapor generating furnace;
    f. combusting the second portion of said carbonaceous fuel together with said cooled char-containing carbon monoxide-rich fuel gas within the combustion zone of the vapor generating furnace in the presence of at least sufficient additional air to substantially complete combustion whereby a hot flue gas is produced having a reduced emission of nitrogen oxide pollutants;
    g. introducing a sulfur capturing material into the combustion zone of the vapor generating furnace so that the combustion of the second portion of said carbonaceous fuel is carried out in the presence of said sulfur capturing material whereby a substantial portion of the sulfur in the second portion of said carbonaceous fuel is captured by said sulfur capturing material; and
    h. passing the flue gas generated in the combustion zone of the vapor generating furnace by combusting the second portion of said carbonaceous fuel together with said cooled carbon monoxide-rich fuel gas therein through a particulate collecting apparatus so as to remove therefrom a substantial portion of the sulfur capturing material with the sulfur captured therein so as to produce a flue gas having a low content of sulfur-based and nitrogen-based pollutants.

2. A process as recited in claim 1 wherein said sulfur-bearing and nitrogen-bearing carbonaceous fuel comprises coal, lignite, carbon-containing refuse and mixtures thereof.

3. A process as recited in claim 1 wherein said sulfur capturing material comprises a pulverized particulate sulfur capturing material.

4. A process as recited in claim 3 wherein said pulverized particulate sulfur capturing material is selected from the group consisting of limestone, dolomite and mixtures thereof.

5. A process as recited in claim 1 wherein the sulfur capturing material is added to the first portion of said sulfur-bearing and nitrogen-bearing carbonaceous fuel prior to introducing the first portion of said sulfur-bearing and nitrogen-bearing carbonaceous fuel into the gasification reactor.

6. A process as recited in claim 1 wherein said sulfur capturing material is added to the second portion of said sulfur-bearing and nitrogen-bearing carbonaceous fuel prior to introducing the second portion of said sulfur-bearing and nitrogen-bearing carbonaceous fuel into the combustion zone of the vapor generating furnace.

7. A process as recited in claim 1 wherein the amount of air present in the gasification chamber comprises an amount less than about 70% of the theoretical amount necessary to stoichiometrically combust the first portion of said carbonaceous fuel introduced into said gasification reactor.

8. A process as recited in claim 7 wherein the amount of additional air present in the combustion zone of the vapor generating furnace comprises an amount greater than the theoretical amount necessary to stoichiometrically combust the second portion of said carbonaceous material together with the char-containing carbon monoxide-rich fuel gas produced by the gasification of the first portion of said carbonaceous material.

9. A process as recited in claim 8 wherein said sulfur capturing material comprises a pulverized particulate sulfur capturing material.

10. A process as recited in claim 9 wherein said pulverized particulate sulfur capturing material is added to the first portion of said carbonaceous fuel prior to introducing the first portion of said carbonaceous fuel into the gasification reactor and is also added to the second portion of said carbonaceous fuel prior to introducing the second portion of said carbonaceous fuel into the combustion chamber of the vapor generating furnace.

11. A process as recited in claim 10 wherein said pulverized particulate sulfur capturing material is selected from the group consisting of limestone, dolomite and mixtures thereof.

* * * * *